Oct. 18, 1927.
R. E. MILLER
1,645,919
DEVICE FOR HOLDING MONOGRAM PLATES
Filed April 23, 1927
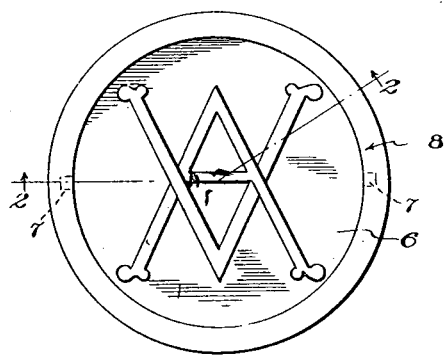
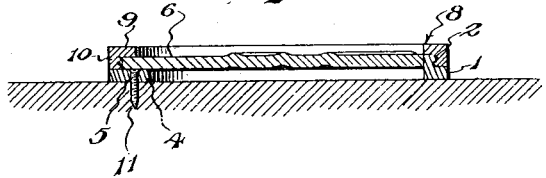
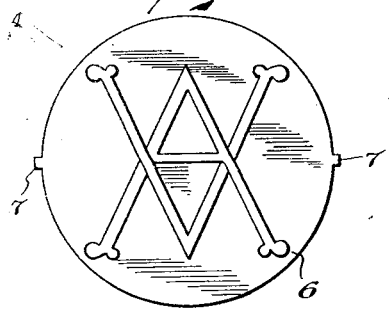
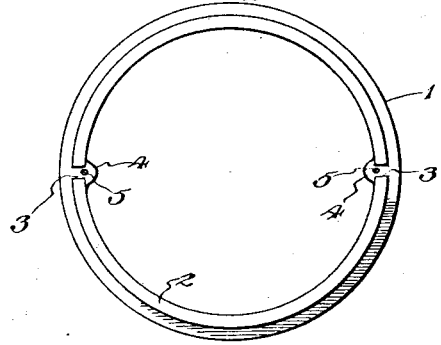
Inventor
R. E. Miller
By Lacey & Lacey, Attorneys Patented Oct. 18, 1927.

1,645,919

UNITED STATES PATENT OFFICE.

ROBERT E. MILLER, OF RIDGEFIELD PARK, NEW JERSEY.

DEVICE FOR HOLDING MONOGRAM PLATES.

Application filed April 23, 1927. Serial No. 186,050.

The present invention is directed to improvements in devices for holding monogram plates.

The primary object of the invention is to provide a device of this kind so constructed that a plate bearing a monogram or other insignia may be easily and conveniently attached to a part of an automobile.

Another object of the invention is to provide a device of this character constructed in such manner that the monogram plate will be prominently displayed, but the means for securing the plate to a part of the automobile will be concealed.

In the accompanying drawing:

Figure 1 is a plan view of the device.

Figure 2 is a sectional view on line 2—2 of Figure 1.

Figure 3 is a plan view of the monogram plate.

Figure 4 is a plan view of the attaching ring.

The device comprises a ring 1 provided with an annular flange 2, said flange being exteriorly threaded, and provided with diametrically opposed notches 3, the purpose of which will be later explained. The inner periphery of the ring 1 has formed integral therewith bosses 4 having openings 5 formed therein, said bosses being located adjacent the respective notches 3.

A plate 6 is provided and may have embossed, stamped, or engraved thereon a monogram or any other insignia desired, said plate having diametrically opposed ears 7, said ears being adapted to engage in the notches 3 of the flange 2 to hold said plate against rotation.

A locking rim 8 is employed and comprises a horizontal web 9 and a vertical web 10, the latter being capable of being threaded upon the flange 2, and when thus engaged the web 9 closes the upper ends of the notches 3 in order to retain the ears 7 therein. The plate 6 will be held in its proper assembled position owing to the fact that the ears 7 carried thereby engage in the notches and the plate will rest upon the inwardly extended bosses 4.

When the ring 1 is secured to a wooden instrument board of an automobile, screws 11 are passed through the openings 5 of the bosses 4, but instances where it is desired to place the device upon metal parts of an automobile, such as the door thereof, bolts will be used in lieu of the screws 11.

Having thus described the invention, I claim:

1. A device of the class described comprising a ring, a flange carried by the ring and having notches therein, a monogram bearing plate having ears for engagement in the notches, and a locking rim engaged with said flange for maintaining the ears within said notches.

2. A device of the class described comprising a ring for attachment to the body of an automobile, a flange rising from the ring and having diametrically opposed notches formed therein, monogram bearing plate having ears upon its periphery for engagement in said notches, a locking rim including vertical and horizontally disposed flanges, the vertical flange being adapted to be threaded upon said flange, said horizontal flange being adapted to close the outer ends of the notches to prevent accidental disengagement of said ears therefrom.

3. A device of the class described comprising a ring, a flange carried by the ring and having diametrically opposed notches formed therein, a monogram bearing plate having ears carried by its periphery and at diametrically opposed points, said ears being adapted to engage said notches, bosses carried by the ring and disposed adjacent said notches, securing devices engageable with said bosses for attaching the ring to a part of an automobile, and a locking ring threaded upon said flange for maintaining the monogram bearing plate confined within said flange.

In testimony whereof I affix my signature.

ROBERT E. MILLER. [L. S.]